United States Patent Office 2,949,169
Patented Aug. 16, 1960

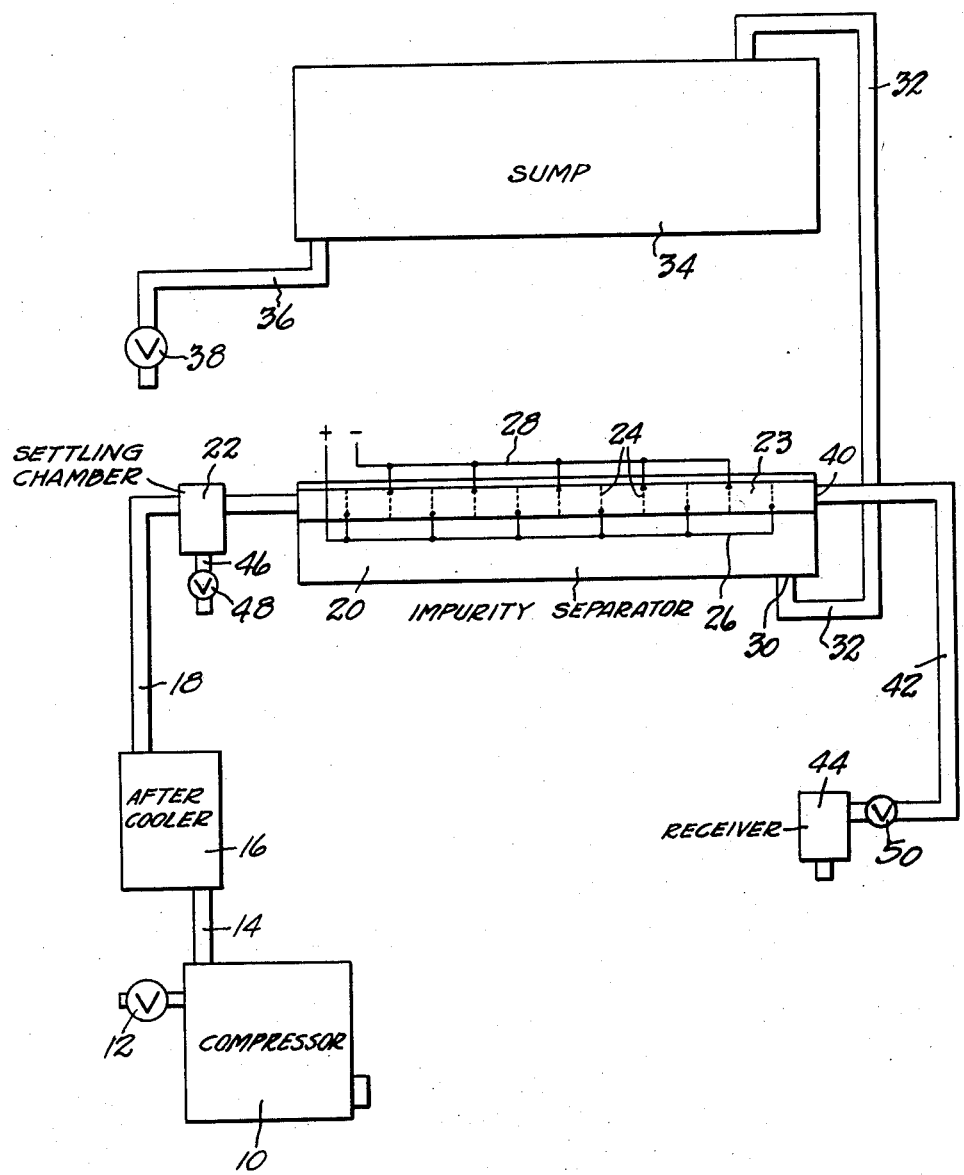

2,949,169

DEVICE FOR SEPARATING IMPURITIES FROM GASES

Frank Sprague, % Sprague Devices, Inc., Michigan City, Ind.

Filed July 5, 1957, Ser. No. 670,003

7 Claims. (Cl. 183—32)

This invention relates to a device for separating impurities from gases, and more particularly it relates to a compressed air system utilizing an air filter, such as a filter of the type shown in my Patent No. 2,701,621, dated February 8, 1955.

The primary object of this invention is to provide a device of this character capable of purifying air used intermittently or periodically in large quantities, wherein a high degree of purification is achieved despite the rapidity of use of the air charge.

A further object is to provide a device of this character wherein an air purifier has a low level outlet which communicates with a storage sump positioned at a level above the separator, which separator also has an outlet communicating with a receiver at a point spaced above the first named outlet of the separator, said device utilizing the sump as an air storage chamber and as a receptacle into which precipitate carried by the air stream can be discharged without danger of release of the precipitate upon flow of air from the sump incident to demand for air at the receiver.

A further object is to provide a device of this character which is simple in construction, from which impurities may be removed quickly and easily, which is readily accessible for repair and inspection, which is well adapted for use in vehicles having compressed air systems, and which is characterized by low cost of operation and substantially fully automatic operation.

Other objects will be apparent from the following specification.

In the drawing:

The sole figure is a schematic view illustrating the device.

Referring to the drawing, the numeral 10 designates a gas compressor of any suitable or conventional type, such as the air compressor used in a locomotive, or a stationary air compressor, or a mobile air compressor used in conjunction with a portable air-operated tool. The compressor will be provided with the usual controls (not shown) by means of which it may be operated to maintain a predetermined air pressure in the system with which it is associated, and may include an unloader valve 12 responsive to the pressure in the system and functioning with other controls to regulate the output of the compressor. Thus the compressor may be of the type having a low rate of output for the purpose of maintaining pressure during the time that the rate of use of compressed gas is low, and a comparatively high capacity operating range at which it operates during the time that air is being withdrawn from the system at a rapid rate. The compressor discharges through an outlet line 14 into an after-cooler 16. The after-cooler 16 may be of any suitable type capable of cooling the compressed air before it passes to the air receiver or air-actuated device connected in the system.

The after-cooler 16 discharges through an outlet conduit 18 into an impurity separator 20. If desired, a settling chamber or gas receiver 22 may be interposed in the conduit 18 between the after-cooler and the impurity separator. Where used, the settling chamber 22 will be so located and positioned as to collect dust and carbon particles and moisture that can be separated from the gas by thermal means. In other words, the settling chamber 22 provides means for precipitating out of the gas stream all particles which tend to be freed from that stream as a result of the reduction in temperature of the gas from its high temperature state occurring at the discharge thereof from the compressor to the lower temperature state thereof occurring at the discharge from the after-cooler. To assist in such precipitation, the settling chamber 22 may be located at a level lower than the after-cooler or lower than the impurity separator, or lower than both.

The impurity separator may be any separator capable of removing impurities from a gas. One example of such separator is that shown in my Patent No. 2,701,621, dated February 8, 1955. Other examples are shown in my co-pending application for Device for Removing Impurities from Gases, executed June 20, 1957, Serial No. 670,053, filed July 5, 1957, and my co-pending application for Air Filter, executed June 20, 1957, Serial No. 670,031, filed July 5, 1957.

The separator will preferably be of the type having a housing with an aperture conduit or passage defining member 23 extending therethrough in communication with the inlet and outlet thereof and spanned by reticulated electrodes 24 which are connected in an electrical circuit so that some thereof will be charged to one polarity and others will be charged to opposite polarity. Thus, in the arrangement shown alternate electrodes are connected to a conductor 26 leading to the positive side of a direct current circuit and the remaining electrodes are connected to a conductor 28 connected to the negative side of a D.C. circuit. The separator 20 will be provided with an impurity discharging outlet 30 at its bottom, into which impurities are discharged by gravity. It will be understood that the impurity separator 20 need not necessarily be an electrical unit, and, instead, may be a simple mechanical air filter so constructed as to discharge impurities collected thereon by gravity to a low level impurity outlet.

A conduit 32 is connected at one end to the impurity outlet 30 and discharges into a sump 34 or other storage receptacle located above the level of the outlet 30 of the separator. The connection between the conduit 32 and the sump 34 is preferably at or adjacent to the top of the sump. The sump may be of any size desired as determined by the storage capacity required in the system. The sump 34 will preferably be a simple sealed vessel capable of storing a charge of compressed air. The sump 34 is provided with a discharge conduit 36 communicating therewith at the bottom thereof and has a normally closed valve 38 interposed therein. The valved outlet 36 provides means for the discharge of foreign matter and impurities from the sump. The valve thereof will be of such a character as to effectively seal the conduit 36 from normal leakage of compressed gas therethrough.

The air discharge outlet 40 of the impurity separator 20 is located at a level above the impurity outlet 30 and has connected thereto a conduit 42 leading to a receiver 44. The receiver 44 may be any gas-utilizing device, such as the air-operated brakes or windshield wipers of a motor vehicle or of a locomotive, or an air hammer or like air-operated tool, and is controlled by a valve 50.

The basic operation of the device or system is the same as the operation of any other compressed air system in that the compressor is controlled to maintain a predetermined gas pressure in the system by operating at low capacity or stand-by capacity during such times as the receiver 44 is not functioning and operating at an increased rate of capacity during such time as the receiver is functioning. The settling chamber 22 provides means for collection of some impurities precipitated out of the air stream after discharge from the after-cooler. It will be understood that some normally closed means (not shown), such as an outlet conduit 46 communicating with the bottom of the chamber 22 and controlled by a normally closed valve 48, may be provided in association with the settling chamber to facilitate withdrawal of the precipitate from the chamber 22 when desired. The valve 48 in this case serves, however, to maintain the sealed condition of the system to prevent leakage of compressed gas during normal functioning of the system.

The impurity separator 20 functions to precipitate from the air stream additional impurities which are collected at the impurity discharge 30 in the lower part thereof.

The operation of the device or the sequence of operation thereof is as follows. The compressor 10 will maintain a charge of gas in the system between predetermined minimum and maximum pressures. This charge of gas exists in the after-cooler 16, the impurity separator 20, the settling chamber 22, the sump 34, the conduits 14, 18, 32 and 42 and in the outlet conduits 36 and 46 ahead of their normally closed valves.

When the charge of gas in the system falls below the predetermined minimum pressure due to demand of gas at the receiver 44, the control for the compressor 10 is actuated to cause the compressor to be operated at its full capacity to supply the demand for gas under pressure at the receiver and to restore the pressure in the system. The pressure in the system is substantially of uniform value in all parts thereof and, therefore, as the compressor operates at a rate greater than the rate of withdrawal of the gas by the receiver 44, or while it continues to operate after the receiver 44 stops, there will be a flow of gas from the impurity separator 20 through the conduit 32 into the sump 34. This flow of gas will carry with it impurities which have collected in the bottom of the separator 20 and will deposit those impurities into the sump 34 in which they can drain to the discharge opening 36. The high capacity operation of the compressor will continue until the predetermined maximum pressure in the system has been reached, whereupon the compressor controls respond to the maximum pressure for the purpose of causing the compressor to operate in stand-by condition. Upon the next demand for gas under pressure at the receiver 44, the gas under pressure in the system is reduced and this entails a flow of gas from the sump 34 through the conduit 32 to the separator 20 and thence from the separator chamber through the conduit 42 to the receiver 44. Since the communication between the conduit 32 and the sump 34 occurs at the top of the sump, the impurities which previously were deposited in the sump are not carried in reverse flow through the conduit 32 with the air stream.

It will be apparent that repeated cycles of the operation of the compressor at alternate full capacity and stand-by capacity result in a pumping operation occurring in the circuit entailing the delivery of impurities from the separator 22 to the sump during each operation of the compressor at high capacity.

Both the sump 34 and the settling chamber 22 may be cleared of impurities collected thereby by the simple expedient of opening the valves 38 and 48 to permit drainage or flow of the impurities therepast. The valves 38 and 48 will normally be sealed so as to prevent the flow of gas under pressure therethrough, and thereby prevent leakage of gas under pressure from the system.

While the system has been illustrated herein as being provided with only one receiver 44, it will be understood that any desired number of receivers may be connected with the outlet of the impurity separator 20, and each thereof may be controlled by a valve operable independently or individually relative to the others or operable simultaneously with one or more of the others.

While the preferred embodiment of the invention has been illustrated and described herein, it will be understood that changes in the construction may be made within the scope of the appended claims without departing from the spirit of the invention.

I claim:

1. A device for separating impurities from gases, comprising a gas compressor, means for precipitating impurities from gas, said means including a housing having a gas inlet, a gas outlet, and an impurity outlet at the bottom of the housing and below the level of said gas outlet, a sump, a receiver, a conduit connecting said compressor with said gas inlet, a conduit connecting said gas outlet with said receiver, and a conduit connecting said impurity outlet with the upper part of said sump.

2. A device for separating impurities from gases comprising a normally sealed gas containing system connecting a compressor and a receiver, means connected in said system for precipitating impurities from gas, said means including a housing having a gas inlet, a gas outlet and an impuritiy outlet at the lowermost part of the housing and below the level of said gas outlet, a sump, and a conduit connecting said impurity outlet with the upper part of said sump.

3. A device of the character defined in claim 2, wherein said compressor is responsive to the pressure in the system to operate at high capacity whenever pressure in the system drops below a predetermined minimum value and to operate at low capacity whenever pressure in the system reaches a predetermined maximum value.

4. A device of the character defined in claim 2, wherein said sump has an impurity outlet at its bottom and a valve normally closing said sump outlet.

5. A device of the character defined in claim 2, and a settling chamber in said system ahead of said impurity precipitating means for collecting impurities separated by change in the temperature of the gas.

6. A device of the character defined in claim 2, a settling chamber in said system ahead of said impurity separator, said chamber having an outlet in its bottom, and a valve normally closing said settling chamber outlet.

7. A device of the character defined in claim 2, wherein an aftercooler is interposed in said system between said compressor and said impurity precipitator, and a settling chamber is interposed in said system between said after-cooler and said impurity precipitator.

References Cited in the file of this patent

UNITED STATES PATENTS

| 1,314,277 | Loppacker | Aug. 26, 1919 |
| 2,701,621 | Sprague | Feb. 8, 1955 |
| 2,771,158 | Bray et al. | Nov. 20, 1956 |

FOREIGN PATENTS

| 678,736 | Great Britain | Sept. 10, 1952 |